US012682116B2

(12) United States Patent (10) Patent No.: US 12,682,116 B2
Hu et al. (45) Date of Patent: Jul. 14, 2026

(54) TRUST MONITORING FOR INPUT TO MESSAGING GROUP

(71) Applicant: Citrix Systems, Inc., Fort Lauderdale, FL (US)

(72) Inventors: Dan Hu, Nanjing (CN); Zongpeng Qiao, Nanjing (CN); Ke Xu, Nanjing (CN)

(*) Notice: Subject to any disclaimer, the term of this patent is extended or adjusted under 35 U.S.C. 154(b) by 629 days.

(21) Appl. No.: 17/482,936

(22) Filed: Sep. 23, 2021

(65) Prior Publication Data

US 2023/0062357 A1 Mar. 2, 2023

Related U.S. Application Data

(63) Continuation of application No. PCT/CN2021/114997, filed on Aug. 27, 2021.

(51) Int. Cl.
*G06F 21/62* (2013.01)
*G06N 20/00* (2019.01)

(52) U.S. Cl.
CPC ........... *G06F 21/629* (2013.01); *G06N 20/00* (2019.01)

(58) Field of Classification Search
CPC .............................. G06F 21/629; G06N 20/00
See application file for complete search history.

(56) References Cited

U.S. PATENT DOCUMENTS

| | | | | | |
|---|---|---|---|---|---|
| 11,936,604 | B2* | 3/2024 | Jakobsson | ........... | H04L 63/1408 |
| 2005/0237305 | A1* | 10/2005 | Klein | ..................... | G06F 3/016 |
| | | | | | 345/168 |
| 2008/0189768 | A1* | 8/2008 | Callahan | ............... | H04L 63/104 |
| | | | | | 726/4 |
| 2009/0172539 | A1* | 7/2009 | Bates | ...................... | G06F 3/011 |
| | | | | | 715/706 |
| 2012/0322549 | A1* | 12/2012 | Kim | ...................... | A63F 13/335 |
| | | | | | 463/29 |
| 2013/0318180 | A1* | 11/2013 | Amin | ................. | G06Q 30/0251 |
| | | | | | 709/206 |
| 2014/0287828 | A1* | 9/2014 | Kalvachev | ............ | G07F 17/326 |
| | | | | | 463/29 |
| 2015/0312197 | A1* | 10/2015 | Dong | ................... | G06F 3/0481 |
| | | | | | 715/752 |
| 2016/0381068 | A1* | 12/2016 | Galula | ................. | G07C 5/0816 |
| | | | | | 726/23 |
| 2016/0381172 | A1* | 12/2016 | Lopiano | ................ | H04L 67/306 |
| | | | | | 709/204 |
| 2017/0064015 | A1* | 3/2017 | Davis | ...................... | H04L 67/52 |

(Continued)

*Primary Examiner* — Moeen Khan
*Assistant Examiner* — Thomas A Carnes

(57) ABSTRACT

Methods and systems for determining and reacting to trust relationships in a messaging group are described herein. A computing device may detect text associated with a messaging group comprising a plurality of different users. The computing device may process the text to determine at least one topic, then generate a trust graph comprising a plurality of connections between a user and each of the plurality of different users. Each of the plurality of connections may indicate a degree of trust corresponding to the at least one topic. The computing device may determine, based on the trust graph, that a first degree of trust, associated with at least one of the plurality of different users, satisfies a threshold. The computing device may cause output of a notification comprising an identity of the at least one of the plurality of different users.

20 Claims, 6 Drawing Sheets

(56) References Cited

U.S. PATENT DOCUMENTS

| | | | | |
|---|---|---|---|---|
| 2017/0346780 | A1* | 11/2017 | Chuang | H04L 51/063 |
| 2018/0060736 | A1* | 3/2018 | Brewer | G06N 5/022 |
| 2018/0109537 | A1* | 4/2018 | Schmidt | H04L 63/105 |
| 2018/0150890 | A1* | 5/2018 | Gupta | G06N 5/02 |
| 2018/0212916 | A1* | 7/2018 | Schaffer | H04L 51/52 |
| 2019/0208370 | A1* | 7/2019 | Brunn | H04L 51/52 |
| 2019/0278821 | A1* | 9/2019 | Doyd | G06F 16/9535 |
| 2019/0378076 | A1* | 12/2019 | O'Gorman | H04M 3/56 |
| 2020/0059375 | A1* | 2/2020 | Hewitt | G06F 40/30 |
| 2020/0065513 | A1* | 2/2020 | Sridharan | G06N 3/08 |
| 2020/0356633 | A1* | 11/2020 | Garlapati | G06F 16/287 |
| 2021/0056554 | A1* | 2/2021 | Muthu | G06Q 10/40 |
| 2021/0097178 | A1* | 4/2021 | Bottaro | G06F 16/24575 |
| 2022/0130267 | A1* | 4/2022 | Li | G09B 5/14 |
| 2022/0311728 | A1* | 9/2022 | Sivaswamy | G06N 3/084 |
| 2022/0385606 | A1* | 12/2022 | Hassan | H04L 51/42 |

* cited by examiner

TRUST MONITORING FOR INPUT TO MESSAGING GROUP

CROSS-REFERENCE TO RELATED APPLICATIONS

This application claims priority to Chinese Application No. PCT/CN2021/114997, entitled Trust Monitoring for Input to Messaging Group, filed Aug. 27, 2021.

FIELD

Aspects described herein generally relate to computer networking, computer-implemented messaging, and hardware and software related thereto. More specifically, one or more aspects describe herein provide for the analysis of trust relationships in messaging groups, then use those trust relationships to provide enhanced security to users providing content to those messaging groups.

BACKGROUND

The popularity of computer-implemented messaging applications, like e-mail applications, text applications, chat applications, online message boards, and the like, has made online communications more pervasive than ever. For example, individuals at a company may use e-mail to communicate with their coworkers more formally, but may additionally use a chat application to communicate with their coworkers somewhat more informally. Such messaging applications may permit users to chat in a messaging group. For example, a group of friends may collectively use a chat application to set up a messaging group (sometimes also referred to as a group chat) to text message informally, plan events, share photos, or the like.

Many messaging groups permit user to freely join and leave, such that the constituency of a particular messaging group may change over time. Such changes can introduce undesired vulnerabilities in the messaging group. For example, while a certain group of users may feel comfortable to speak about certain topics (e.g., their personal issues) in a messaging group when it has a first set of members (e.g., friends), changes within the messaging group (e.g., the addition of new/unfamiliar users) may mean that the existing users may feel less comfortable speaking about those topics. For example, a messaging group may comprise only company employees (e.g., such that the employees may feel comfortable talking about company secrets), but a company client may later join the messaging group. In such a circumstance, the company employees should (ideally) no longer speak about company secrets. That said, those company employees might not recognize the changes to the membership of the messaging group until it is too late—that is, until they've inadvertently sent company secrets to the messaging group.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards analyzing, through a trust graph, trust between members of a messaging group, and using the analyzed trust graph to warn users when content they plan to send via the messaging group may be received by one or more untrusted users.

A computing device may detect text, input by a user of a messaging application, associated with a messaging group comprising a plurality of different users. The computing device may process the text to determine at least one topic. The computing device may generate a trust graph that comprises a plurality of connections between the user and each of the plurality of different users. Each of the plurality of connections may indicate a degree of trust, corresponding to the at least one topic, between the user and each of the plurality of different users. The computing device may determine, based on the trust graph, that a first degree of trust, associated with at least one of the plurality of different users, satisfies a threshold. Then, the computing device may cause output of a notification comprising an identity of the at least one of the plurality of different users.

The trust graph may be generated in a variety of ways. For example, the trust graph may be generated by processing a history of messages between the user and the plurality of different users. The trust graph may additionally and/or alternatively be periodically updated. For example, the computing device may detect that a new user has joined the messaging group. Then, the computing device may generate an updated trust graph that comprises a second plurality of connections between the user, each of the plurality of different users, and the new user.

The text may be processed in a variety of different ways. For example, the computing device may process the text to determine the at least one topic using a topic model. The topic model may be a Latent Dirichlet allocation generative statistical model. Additionally and/or alternatively, processing the text may comprise removing, from the text, one or more stop words. Additionally and/or alternatively, the topic may be determined using machine learning techniques. For example, the computing device may provide, to a trained machine learning model, the text, wherein the trained machine learning model has been trained, using training data, to determine one or more topics based on input data, and wherein the training data comprises messaging data tagged based on the one or more topics. The computing device may then receive, as output from the trained machine learning model and based on the text, the at least one topic.

The notification may be configured in a variety of ways. For example, the notification may be configured to prevent the user from adding the text to the messaging group until the user acknowledges the notification.

The threshold may be set based on a variety of different considerations. For example, the threshold may be based on a security level of the at least one topic.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
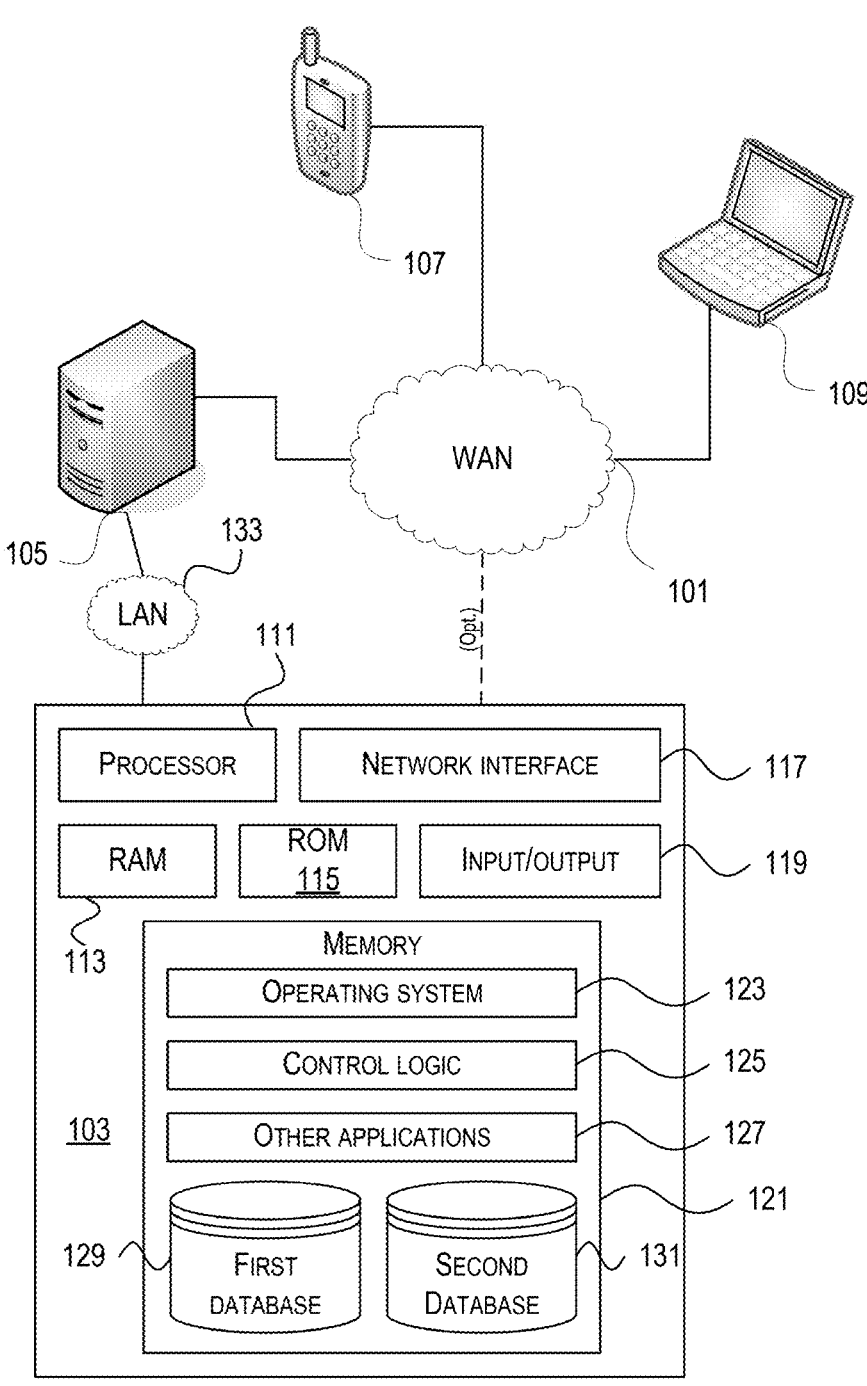
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards managing trust relationships in messaging groups. A messaging application may permit users to input and share content (e.g., text, images, audio, video, documents or the like) with other users. Such content may be shared through a messaging group. A messaging group may comprise a plurality of different users. The membership of a messaging group may change over time, such that users may be added, removed, or otherwise modified over time. Such changes in the membership of a messaging group can impact the level of trust in the messaging group over time. For example, while a user may feel comfortable discussing topics with certain users of a messaging group, the same user might not feel comfortable discussing those same topics with new entrants to the messaging group. Moreover, the topics with which the messaging group discusses (and, in turn, which topics may be appropriate and/or inappropriate for discussion via the messaging group) may change. For example, when a messaging group changes, the topics with which the group typically discusses may change.

As will be described in further detail below, aspects described herein relate to detecting when input, from a user of a messaging application intended for a messaging group, may be received by one or more untrusted users in a messaging group. To effectuate this step, a computing device may process input (e.g., text) provided by a user to determine at least one topic. For example, a user may plan to send, to a messaging group, a message regarding politics. The computing device may then generate a trust graph that comprises a plurality of connections between the user and each of the plurality of different users. That trust graph may represent, for each of a plurality of different users (e.g., of a messaging group), a degree of trust corresponding to the at least one topic. Based on the trust graph, the computing device may determine that a first degree of trust, associated with at least one of the plurality of different users, satisfies a threshold. For example, the user that plans to send a political message may trust many users in the messaging group, but may be unfamiliar with (e.g., might not regularly discuss politics with) a new user to the messaging group. In turn, the computing device may cause output of a notification comprising an identity of the at least one of the plurality of different users. For example, the computing device may output a pop-up message that informs the user that they may want to reconsider sending the political message, as a new (and potentially untrusted) member has recently joined the messaging group.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
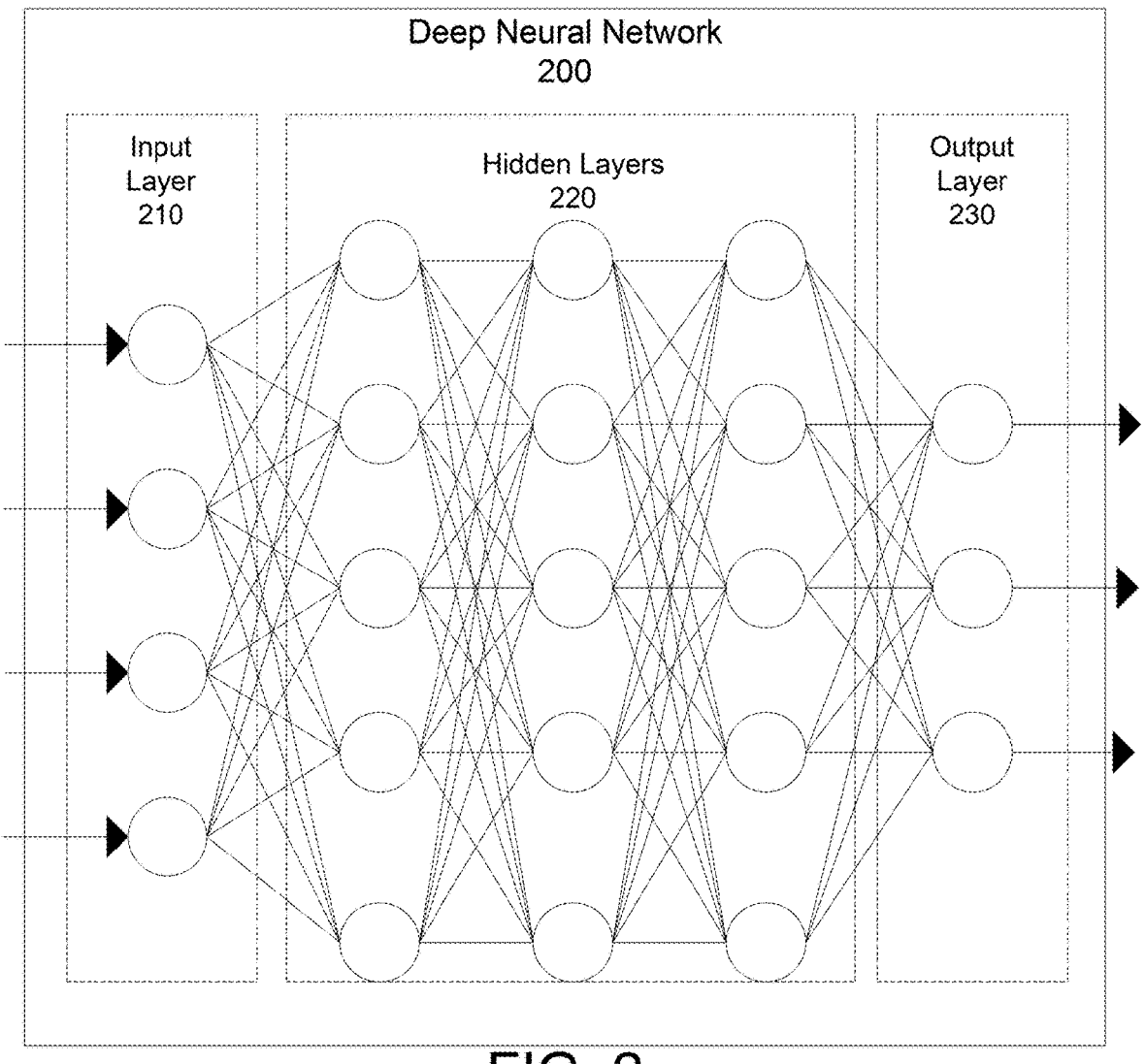
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Analysis of Trust in Messaging Group

Figure 3:
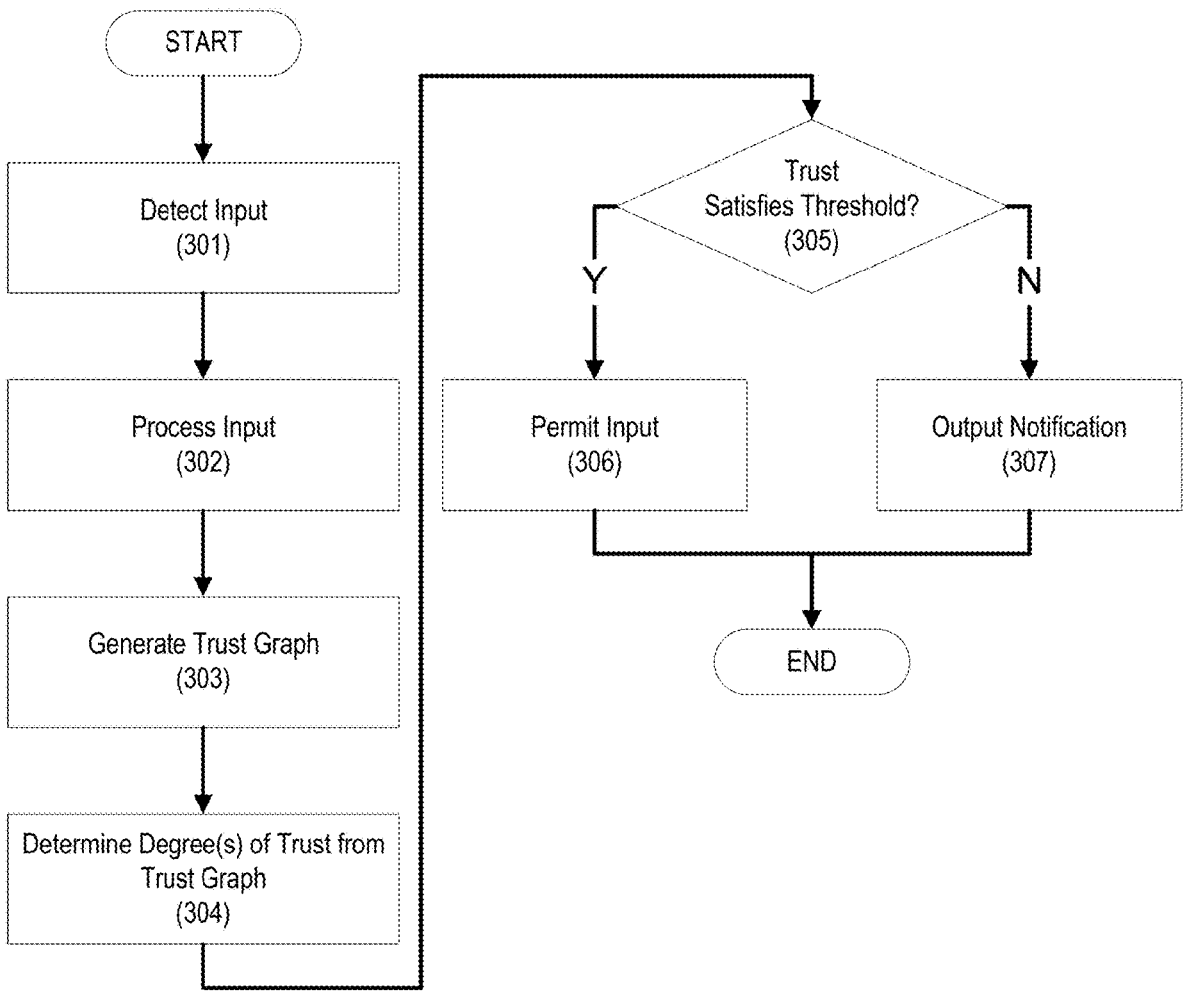
FIG. 3 comprises an illustrative flow chart depicting steps for outputting notifications based on a trust graph.

FIG. 3 depicts an illustrative flow chart depicting steps for outputting a notification based on a trust graph for a messaging group. One or more of the steps depicted in FIG. 3 may be performed by a computing device, such as one or more of the devices 101, 105, 107, 109 of FIG. 1. A computing device may comprise one or more processors and memory storing instructions that, when executed by the one or more processors, cause performance of one or more of the steps of FIG. 3. One or more non-transitory computer-readable media may store instructions that, when executed by one or more processors of a computing device, cause the computing device to perform one or more of the steps of FIG. 3. The steps depicted in FIG. 3 are illustrative, such that one or more of the steps depicted in FIG. 3 may be omitted, re-arranged, or the like.

As a general introduction to FIG. 3, a first user may want to provide some form of input (e.g., text, images) to a messaging group (e.g., a group in a chat application, such as a group chat on a social networking website). That input may relate to one or more topics (e.g., sports, politics, or the like). In turn, because of changes in the demographics of the messaging group (e.g., a new user joining the messaging group), the first user might not trust one or more other users in the messaging group with respect to the topic. For example, if the input is related to personal issues experienced by the first user, the first user might not trust a new user (e.g., a new user to the messaging group) to keep their personal issues secret. The steps described in FIG. 3 address these and other issues by analyzing the messaging group using a trust graph, then using that analysis to warn a user if input intended for a messaging group may be received by an untrusted recipient.

In step 301, a computing device may detect input. Input may be any form of computerized input provided by one or more users, such as text, audio content (e.g., a voice recording), graphical content (e.g., images, video), or the like. For example, the input may be a conversation snippet. The input may be associated with a messaging group. For example, the input may be entry, by a user, of text into a text box as part of a chat application, with that text intended for a messaging group. The manner in which the input is provided may differ from application to application. For example, for a bulletin board web application, the input might be text entered into a HyperText Markup Language (HTML) input field. As another example, for a photo sharing application, the input might be captured via a camera of a smartphone, then stored in memory of the smartphone in advance of transmission to a group image chat.

The input may be detected in step 301, but it need not be already provided to (e.g., posted to, sent to) the messaging group. As such, the input may be input into one or more input fields of an application (e.g., a messaging application, such as a chat application), but that input need not be submitted by, e.g., pressing a send button or similar button. For example, the computing device may detect text, input by a user of a messaging application, associated with a messaging group comprising a plurality of different users. The input may be detected by the computing device by periodically checking one or more input fields of an application. Users may, for example, type text into a text field in a messaging application, then subsequently press a button (e.g., a send button) to send that text to a messaging group. In such a circumstance, the input may be detected while it is being entered into the text field (e.g., and before the button is pushed), and/or the input may be detected after the button is pressed but before the text is actually provided to the messaging group. In the former case (e.g., where the text is detected before the button is pushed), the computing device may periodically (e.g., every second) check the contents of the text field to determine whether a user has entered text. Such an implementation may advantageously allow aspects described herein to be performed without significant user interface interruption: for example, as will be described below with respect to step 307, a notification may be output while a user adds content to input fields, in effect warning the user far in advance about any trust issues that may originate from the input.

In step 302, the computing device may process the input detected in step 302. Processing the input may comprise determining one or more topics associated with the input. Input (e.g., text, images, audio) may relate to multiple topics at once. For example, a message such as "I plan to go to Baltimore to see the Ravens" may relate to topics such as travel and sports. As another example, a message such as "I like to eat pizza with my spouse" may relate to both food and relationships. The degree to which input relates to one or more topics may be scored using objective or subjective values, such as Boolean values, percentage values, or the like. Returning to one of the examples above, for example, the message "I plan to go to Baltimore to see the Ravens" may be 80% related to sports and 30% related to travel.

The computing device may process the text to determine the at least one topic using a topic model. Broadly, topic modeling may be any form of modeling to identify one or more topics that occur in content, such as the input detected in step 301. Such topic modeling may involve steps such as tokenization (e.g., splitting the input into discrete parts, such as sentences/words), stemming and/or Lemmatization (e.g., removal of "ing" from the word "running"), removal of one or more stop words (e.g., pronouns, articles, prepositions, conjunctions), or the like. The topic model may be, for example, a Latent Dirichlet allocation generative statistical model.

The computing device may process the text to determine the at least one topic using a machine learning algorithm. Because the nature of computerized communications can be quite complicated (and, e.g., quite subtle), it may be desirable to train a machine learning model to identify topics based on past conversations. In this way, the machine learning model may thereby learn how users talk about certain topics, even when they do so obtusely. A machine learning model may be trained, using training data, to determine one or more topics based on input data. That training data may comprise messaging data tagged based on the one or more topics. For example, the training data may comprise a history of all conversations between one or more users over a period of time, such as a year. The users to which the training data pertains may be the same as those associated with the messaging group to which the input is intended in step 301. Additionally and/or alternatively, the users to which the training data pertains may be different than those associated with the messaging group to which the input is intended in step 301. Then, the computing device may provide, to a trained machine learning model, the input (e.g., the text). The computing device may then receive, as output from the trained machine learning model and based on the text, the at least one topic.

Where the input comprises audio data (e.g., a voice recording), processing the input may comprise using one or more speech-to-text algorithms. For example, a messaging application may permit users to exchange voice messages in a messaging group. In such a circumstance, the topic(s) of such voice messages might be determined by processing the voice messages using a speech-to-text algorithm, then using the steps described above with respect to text content to determine one or more topics.

If the input comprises graphical content (e.g., video, images), processing the input may comprise using one or more object recognition algorithms. Users in a messaging group might share images that suggest one or more topics of discussion. For example, users in a messaging group sharing pictures of a recent baseball game might thereby be said to be discussing, however obliquely, the topic of baseball. In such a circumstance, object recognition algorithms might be used to process an image in a messaging group to determine one or more topics associated with the image.

In step 303, the computing device may generate a trust graph. A trust graph may be a computerized representation of how different users trust one another with respect to one or more topics. In this context, trust between a first user and a second user may refer to whether the first user may be comfortable sending content relating to a topic to the second user. In this manner, the trust graph may indicate how different users are associated with (e.g., connected to) one another with respect to one or more topics. For example, a trust graph may comprise a plurality of connections between users, with each of the plurality of connections indicating a degree of trust, corresponding to at least one topic, between two or more users. A trust graph may thereby indicate, for instance, that two users may trust each other when chatting about computers, but might not trust each other when chatting about politics. An example of such a trust graph is provided as FIG. 4, and an illustrative flowchart of how such a trust graph may be generated is provided as FIG. 5. Both of these figures are discussed in further detail below.

To determine trust between two users with respect to a particular topic, one or more messages between those users may be processed using a topic model. Such a topic model may be the same or different as discussed with respect to step 302. An illustrative method of such processing, as implemented in step 303, is as follows. Say, for example, that there are N messages exchanged between two users (e.g., via a messaging application). Each of these messages may be represented as a variable, C, such that the topic distribution of these messages may be represented as:

$$\begin{cases} C_{i1} \\ C_{i2} \\ \ldots \\ C_{iK} \end{cases} 1 \le i \le N$$

In this example, the topic distribution of these conversation may be calculated as follows:

$$TD(A, B) = \begin{cases} C_{(A,B)1} \\ C_{(A,B)2} \\ \ldots \\ C_{(A,B)K} \end{cases}$$

Where each topic (that is, each C(A,B)) may be calculated in the following manner:

$$C_{(A,B)j} = \frac{\sum_{k=1}^{N} C_{ij}}{N}$$

Following this calculation, a trust score for a topic distribution may be calculated as follows:

$$\mathrm{TRUST} = 1 - \sqrt{\sum_{i=1}^{K} (X_i - C_{(A,B)i})^2}$$

This is but one way in which a trust score might be calculated. While this method generally may result in a trust score that represents a percentage, other approaches (e.g., those which indicate a degree of trust represented as a Boolean value or the like) may be implemented.

The trust graph may be generated based on past messages between different users. For example, a trust graph between a group of users may be determined based on a history of messages between that group of users. The one or more topics in the trust graph might be the same or different as the one or more topics associated with the input received in step 301. For example, in the context where a user provides input as part of step 301, and where that input is intended for a messaging group comprising a plurality of different users, the computing device may generate the trust graph by processing a history of messages between the user and the plurality of different users. To effectuate such a generation of the trust graph, the computing device may retrieve, from one or more databases, a history of messages associated with a plurality of users (e.g., in the same messaging group, one or more different messaging groups, or a combination thereof), then process that history of messages to identify one or more topics discussed by the plurality of users. The processing of those historical messages may be the same or similar as the processing described in step 302. For example, a topic model and/or machine learning model may be used to analyze past messages exchanged by a plurality of users.

The trust graph may be updated based on changes to the messaging group. Because a topic model may represent trust between a plurality of users in a messaging group, changes in the membership of a messaging group may mean that a trust graph for that messaging group should be updated. For example, the computing device may detect that a new user has joined the messaging group. This change may be detected by periodically analyzing a membership list associated with the messaging group, monitoring notifications output by a messaging application, or the like. Then, the computing device may generate an updated trust graph that comprises a second plurality of connections between users. For example, the steps described with respect to step 303 may be repeated responsive to detecting a change to the membership of a messaging group.

In step 304, the computing device may determine one or more degrees of trust, for one or more topics (e.g., those related to the input received in step 301), based on the trust graph. For example, the computing device may identify a degree of trust for one or more topics to which the input detected in step 301 pertains. Such a determination may be made for a plurality of different users in a messaging group. In this manner, the computing device may determine, for the one or more topics of the input received in step 301, how much the user trusts one or more other users in the messaging group with respect to those one or more topics.

As indicated with respect to step 303, the one or more degrees of trust determined in step 304 may be represented in any subjective or objective format. For example, a degree of trust between two users and pertaining to a topic may be represented in a Boolean format, with "TRUE" as trusted and "FALSE" as untrusted. As another example, a degree of trust between two users and pertaining to a topic may be represented as a percentage, with 0% representing a complete lack of trust, 50% representing partial trust, and 100% representing complete trust.

In step 305, the computing device may determine whether the one or more degrees of trust determined in step 304 satisfy a threshold. In this manner, the computing device may determine whether the user associated with the input detected in step 301 sufficiently trusts other users in the messaging group with respect to the topic(s) of the input. For example, the computing device may determine, based on the trust graph, that a first degree of trust, associated with at least one of the plurality of different users, satisfies a threshold (e.g., associated with a lack of trust). If the answer to step 305 is yes, such that the degree(s) of trust satisfy the threshold, the computing device may proceed to step 306. Otherwise, if the answer to step 305 is no, such that the degree(s) of trust do not satisfy the threshold, then the flow chart may proceed to step 307.

The threshold used in step 305 might correspond to trust or an absence thereof. For example, determining whether the one or more degrees of trust determined in step 304 satisfy a threshold may comprise determining that at least one user in a messaging group is not trusted regarding one or more topics. Additionally and/or alternatively, determining whether the one or more degrees of trust determined in step 304 satisfy a threshold may comprise determining that all users in a messaging group are sufficiently trusted regarding one or more topics. As such, the process in step 305 may comprise checking whether a user sufficiently trusts each and every other user of a messaging group with respect to one or more topics. In this manner, when a first user provides input (e.g., the input detected in step 301) associated with one or more topics, the computing device may search for instances where the first user does not sufficiently trust at least one other user in the messaging group with respect to the one or more topics.

The threshold may be based on the at least one topic to which the input received in step 301 pertains. Different topics may have a different level of privacy for a user: for example, while a user may be comfortable with talking about sports with complete strangers, the same user may be less comfortable with talking about their personal health issues. In this way, for example, the threshold may be based on a security level of at least one topic. The security level may correspond to, for example, whether the at least one topic pertains to the personal lives of one or more users. The security level may additionally and/or alternatively correspond to, for example, whether the topic is considered confidential in an organization. The security level may additionally and/or alternatively correspond to, for example, whether the topic may be considered salacious and/or embarrassing if disclosed publicly. In this manner, as will be described below, a higher degree of trust between users might be required for more sensitive subjects.

In step 306, if the one or more degrees of trust satisfy the threshold (e.g., such that all users in a messaging group are sufficiently trusted as to one or more topics), the computing device may permit the input referenced in step 301. In this manner, the user may be permitted to provide the input without any form of notification or similar hindrance. That said, the user may additionally and/or alternatively be provided some form of non-intrusive notification that the input has been checked. For example, step 306 may comprise causing a text field to be tinted green, indicating that the input is safe to send to the messaging group.

In step 307, if the one or more degrees of trust do not satisfy the threshold (e.g., at least one user in a messaging group is not sufficiently trusted as to one or more topics), the computing device may output a notification in step 307. A notification may be any form of an indication, to the user associated with the input received in step 301, that the input may be received by an untrusted user. The notification may identify the untrusted user(s): for example, the computing device may cause output of a notification comprising an identity of one or more users for whom the degrees of trust do not satisfy the threshold. The notification may additionally and/or alternatively indicate the one or more topics regarding which the degrees of trust do not satisfy the threshold. An example of such a notification is provided in FIG. 6.

The notification need not prevent the user from providing their input to the messaging group. In this manner, the notification may warn the user that their input might be received by an untrusted user, but need not prevent them from actually sending the input to the messaging group. For example, the notification may be configured to prevent the user from adding text to the messaging group until the user acknowledges the notification by, e.g., pressing a button, closing the notification, or the like.

Figure 4:
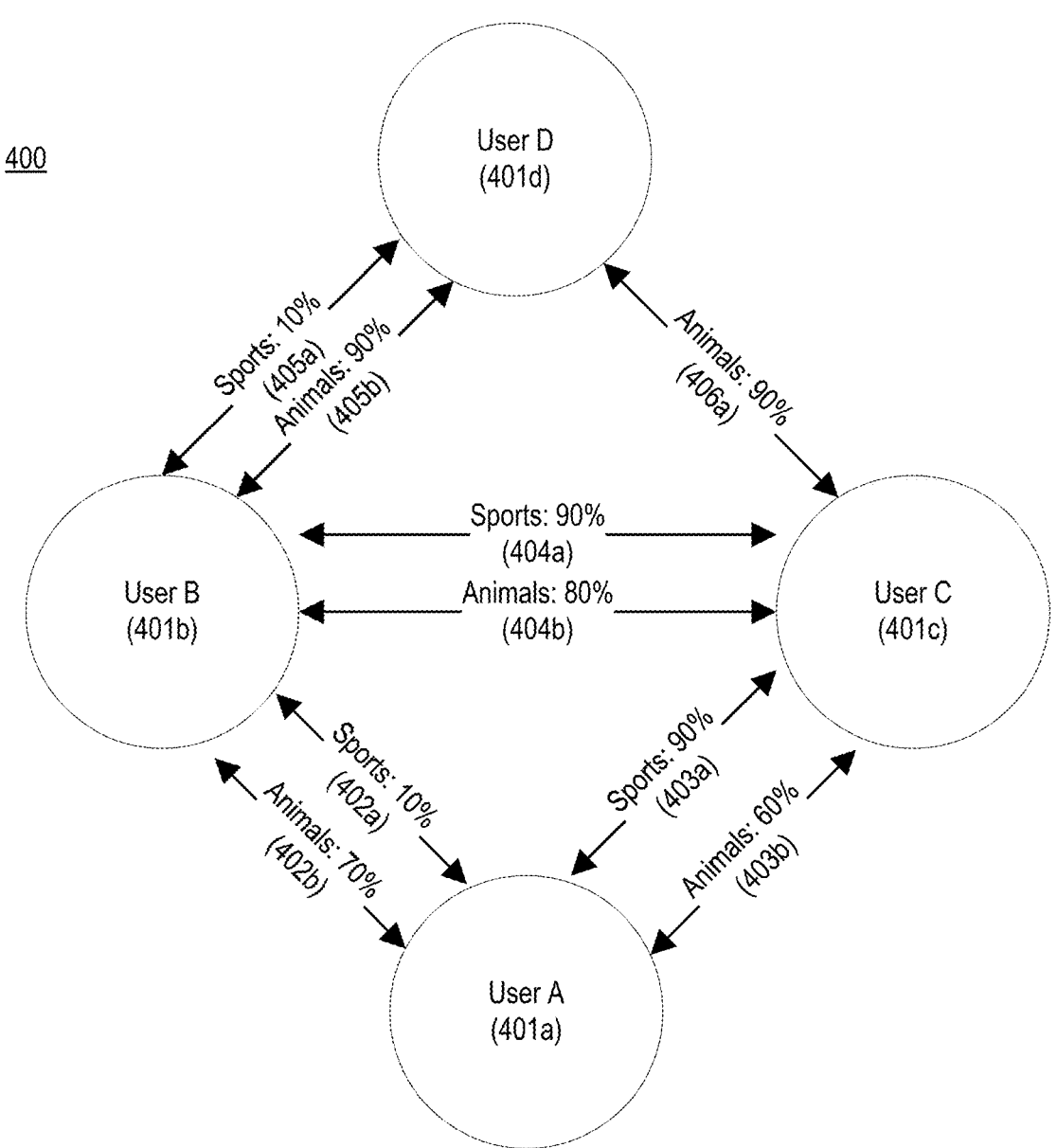
FIG. 4 depicts an illustrative trust graph involving four users.

FIG. 4 provides an example of a trust graph 400, such as one that may be generated as part of step 303 of FIG. 3. More specifically, FIG. 4 depicts four users: a user A 401a, a user B 401b, a user C 401c, and a user D 401d. A variety of connections are depicted between the users, with each indicating a degree of trust pertaining to a different topic. A first connection 402a shows that the user A 401a and the user B 401b have a 10% degree of trust pertaining to sports. A second connection 402b shows that the user A 401a and the user B 401b have a 70% degree of trust pertaining to animals. A third connection 403a shows that the user A 401a and the user C 401c have a 90% degree of trust pertaining to sports. A fourth connection 403b shows that the user A 401a and the user C 401c have a 60% degree of trust pertaining to animals. A fifth connection 404a shows that the user B 401b and the user C 401c have a 90% degree of trust pertaining to sports. A sixth connection 404b shows that the user B 401b and the user C 401c have an 80% degree of trust pertaining to animals. A seventh connection 405a shows that the user B 401b and the user D 401d have a 10% degree of trust pertaining to sports. An eighth connection 405b shows that the user B 401b and the user D 401d have a 90% degree of trust pertaining to animals. A ninth connection 406a shows that the user C 401c and the user D 401d have a 90% degree of trust pertaining to animals.

The trust graph 400 illustrates that trust relationships need not be established between all users of a messaging group. For example, the user C 401c and the user D 401d do not have any connection relating to politics, and the user A 401a has no connections with the user D 401d. Such a circumstance may suggest that the user C 401c and the user A 401a have never discussed politics with the user D 401d. Additionally and/or alternatively, such a circumstance might indicate that past messages between the messaging group (e.g., processed as part of step 303 of FIG. 3) did not indicate discussions between the user A 401a and the user D 401d.

As an example of how the trust graph 400 may be used, say, for example, that the user A 401a wishes to provide input to a messaging group (e.g., a messaging group comprising the user A 401a, the user B 401b, the user C 401c, and the user D 401d) regarding sports. The trust graph 400 may have been generated based on processing of messages between each of the users (e.g., the user A 401a, the user B 401b, the user C 401c, and the user D 401d). The trust graph 400 indicates that the user A 401a trusts the user B 401b and the user C 401c regarding animals, but does not have any connections (and thus, no trust with) the user D 401d. In such a circumstance, a notification may be output: even with a relatively permissive threshold, because the user A 401a has no preestablished connections with (and thus no trust with) the user D 401d, the user may be warned that input relating to sports may be received by the user D 401d.

As another example of how the trust graph 400 may be used, say, for example, that the user A 401a wishes to provide input to a messaging group (e.g., a messaging group comprising the user A 401a, the user B 401b, the user C 401c, and the user D 401d) regarding animals. As with the circumstance described above, the user A 401a has no connections with (and thus no trust with) the user D 401d. With that said, because the eighth connection 405b and the ninth connection 406a both indicate that the user B 401b and the user C 401c both trust the user D 401d regarding animals a great deal, whether a notification is provided (e.g., as part of step 305 and step 307 of FIG. 3) may depend on the threshold used in step 305 of FIG. 3. For example, certain thresholds may be satisfied, even where a user does not have a direct connection with a user, when other users in a messaging group highly trust a user as to a particular topic.

Figure 5:
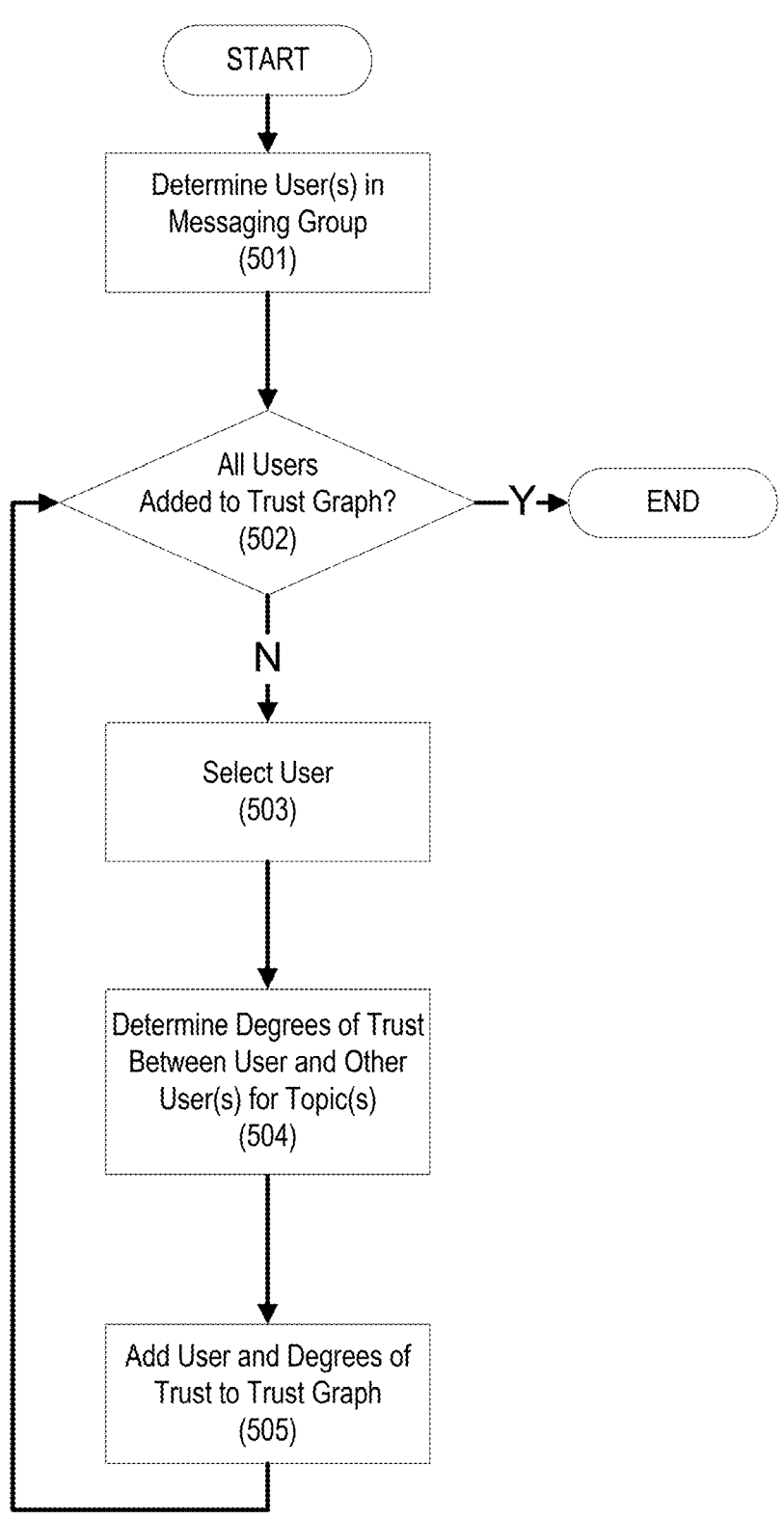
FIG. 5 comprises an illustrative flow chart depicting steps for generating a trust graph.

FIG. 5 depicts a flowchart depicting steps for generation of a trust graph, such as the trust graph 400 of FIG. 4. One or more of the steps depicted in FIG. 5 may be performed by a computing device, such as one or more of the devices 101, 105, 107, 109 of FIG. 1. A computing device may comprise one or more processors and memory storing instructions that, when executed by the one or more processors, cause performance of one or more of the steps of FIG. 5. One or more non-transitory computer-readable media may store instructions that, when executed by one or more processors of a computing device, cause the computing device to perform one or more of the steps of FIG. 5. The steps depicted in FIG. 5 are illustrative, such that one or more of the steps depicted in FIG. 5 may be omitted, re-arranged, or the like.

In step 501, a computing device may determine one or more users in a messaging group. Determining the one or more users in the messaging group may comprise analyzing a membership list of a messaging group, monitoring notifications output by a communications application relating to a messaging group, or the like. The users may be identified based on unique usernames, their legal names, user identifiers, or the like.

In step 502, the computing device may determine whether all users have been added to a trust graph. In this manner, step 502 begins a loop that iterates through every user identified in step 501. If all users have been added to the trust graph, the flow chart in FIG. 5 ends. Otherwise, the flow chart proceeds to step 503.

In step 503, the computing device may select a user. For example, the computing device may select, from the users determined in step 501, a user that has not yet been added to the trust graph. The user might be selected by their username, their legal name, and/or some other identifier of the user.

In step 504, the computing device may determine one or more degrees of trust, corresponding to one or more topics, between the user and all other users in the trust graph. This process may be the same or similar as discussed with respect to step 303 of FIG. 3. As part of step 504, the computing device may process a history of messages between the selected user and other users to identify one or more topics discussed by the selected user. Then, the computing device may determine a degree of trust between the selected user and other users relating to the identified one or more topics. Such a process may, as indicated with respect to FIG. 3, entail use of a machine learning model.

In step 505, the computing device may add the user identified in step 503 as well as the degrees of trust determined in step 504 to the trust graph. The flow chart in FIG. 5 may then return to step 502, where additional user(s) may be added to the trust graph, and/or where the flow chart may end. The end result may be a trust graph similar to the trust graph 400 of FIG. 4.

Figure 6:
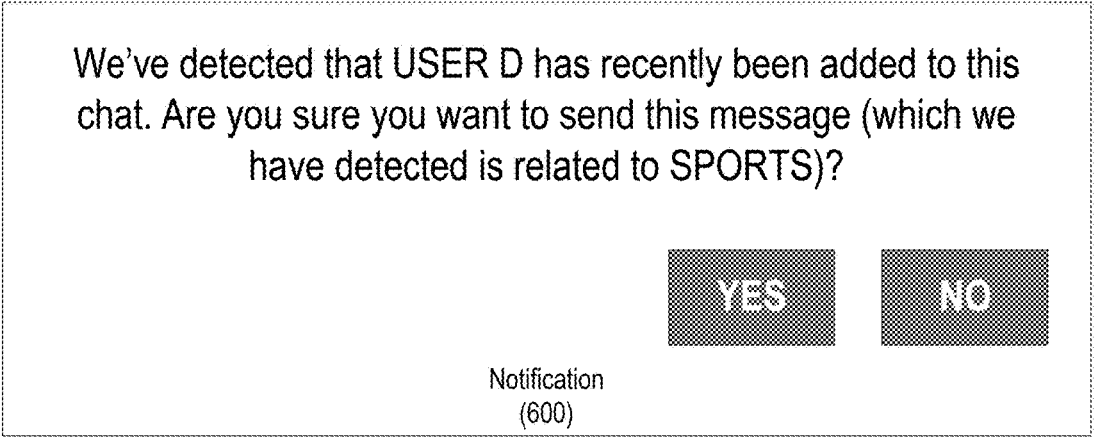
FIG. 6 depicts an illustrative notification.

FIG. 6 depicts an illustrative notification 600. The notification 600 indicates that a new user has been added to a messaging group, and that the user may want to consider whether to send text relating to a particular topic to that user. The notification 600 illustrates that the notification 600 need not prevent the user from providing the input (e.g., the input received in step 301 of FIG. 3).

Figure 7:
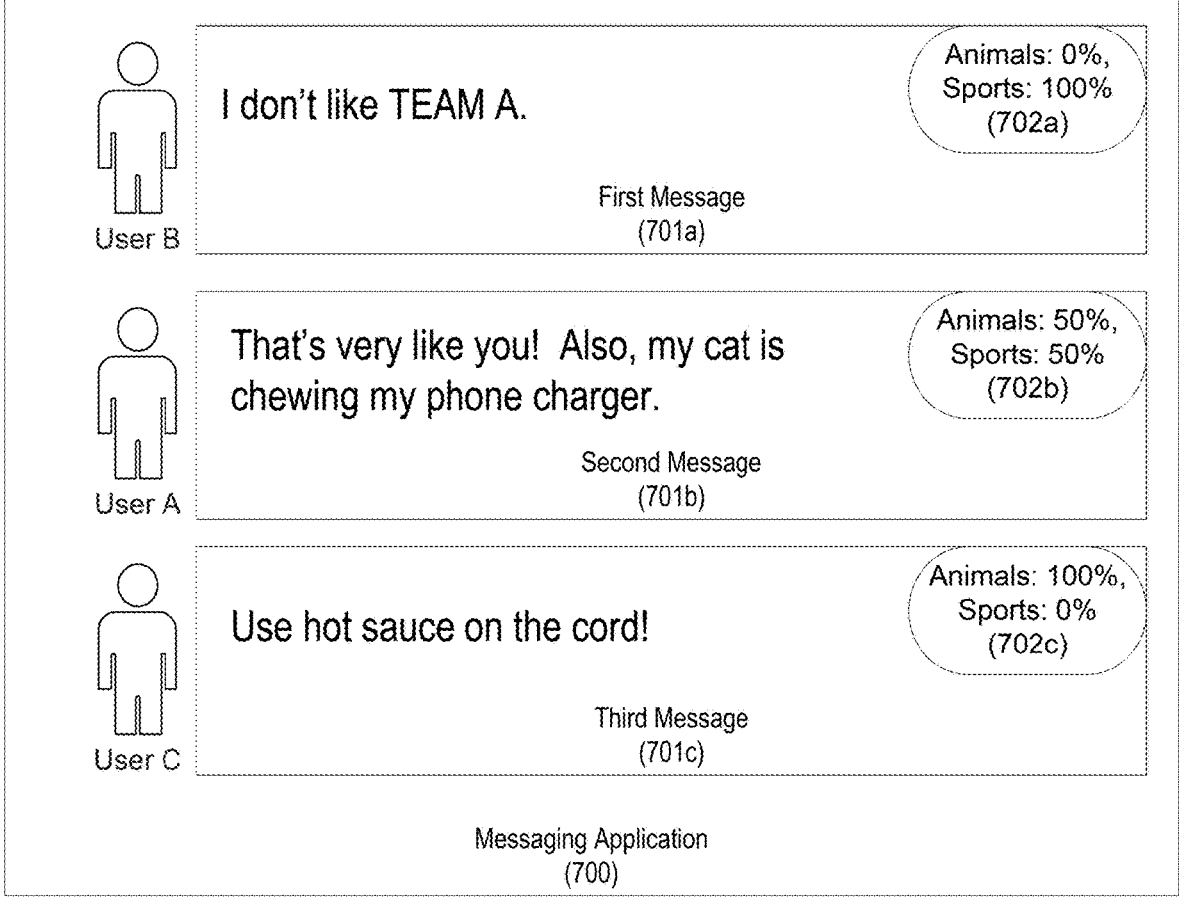
FIG. 7 depicts an illustrative messaging group, with different messages identified as related to different topics.

FIG. 7 depicts an example user interface from a messaging application 700, with three messages (a first message 701a, a second message 701b, and a third message 701c) shown in the messaging application. For the purposes of illustration, topic indications are also displayed as part of FIG. 7. These topic indications may indicate processing (e.g., by a topic model and/or machine learning model) of the messages. In particular, a first topic indication 702a indicates that the first message 701a is related 0% to animals and 100% to sports, a second topic indication 702b indicates that the second message 701b is related 50% to animals and 50% to sports, and a third topic indication 702c indicates that the third message 701c is related 100% to animals and 0% to sports. In this manner, the topic indications (e.g., the first topic indication 702a, the second topic indication 702b, and the third topic indication 702c) may represent the processing performed to identify topics as part of processing historical messages to determine the trust graph in step 303 of FIG. 3.

The following paragraphs (M1) through (M9) describe examples of methods that may be implemented in accordance with the present disclosure.

(M1) A method comprising detecting, by a computing device, text, input by a user of a messaging application, associated with a messaging group comprising a plurality of different users; processing, by the computing device, the text to determine at least one topic; generating, by the computing device, a trust graph that comprises a plurality of connections between the user and each of the plurality of different users, where each of the plurality of connections indicates a degree of trust, corresponding to the at least one topic, between the user and each of the plurality of different users; determining, by the computing device and based on the trust graph, that a first degree of trust, associated with at least one of the plurality of different users, satisfies a threshold; and causing, by the computing device, output of a notification comprising an identity of the at least one of the plurality of different users.

(M2) A method may be performed as described in paragraph (M1) wherein generating the trust graph comprises processing a history of messages between the user and the plurality of different users.

(M3) A method may be performed as described in any one of paragraphs (M1)-(M2), wherein processing the text to determine the at least one topic comprises using a topic model.

(M4) A method may be performed as described in paragraph (M3) wherein the topic model is a Latent Dirichlet allocation generative statistical model.

(M5) A method may be performed as described in any one of paragraphs (M1)-(M4), wherein the notification is configured to prevent the user from adding the text to the messaging group until the user acknowledges the notification.

(M6) A method may be performed as described in any one of paragraphs (M1)-(M5), wherein the threshold is based on a security level of the at least one topic.

(M7) A method may be performed as described in any one of paragraphs (M1)-(M6), further comprising detecting that a new user has joined the messaging group; and generating an updated trust graph that comprises a second plurality of connections between the user, each of the plurality of different users, and the new user.

(M8) A method may be performed as described in any one of paragraphs (M1)-(M7), wherein processing the text to determine the at least one topic comprises: providing, to a trained machine learning model, the text, wherein the trained machine learning model has been trained, using training data, to determine one or more topics based on input data, and wherein the training data comprises messaging data tagged based on the one or more topics; and receiving, as output from the trained machine learning model and based on the text, the at least one topic.

(M9) A method may be performed as described in any one of paragraphs (M1)-(M8), wherein processing the text to determine the at least one topic comprises removing, from the text, one or more stop words.

The following paragraphs (A1) through (A9) describe examples of apparatuses that may be implemented in accordance with the present disclosure.

(A1) A computing device comprising: one or more processors; and memory storing instructions that, when executed by the one or more processors, cause the computing device to: detect text, input by a user of a messaging application, associated with a messaging group comprising a plurality of different users; process the text to determine at least one topic; generate a trust graph that comprises a plurality of connections between the user and each of the plurality of different users, where each of the plurality of connections indicates a degree of trust, corresponding to the at least one topic, between the user and each of the plurality of different users; determine, based on the trust graph, that a first degree of trust, associated with at least one of the plurality of different users, satisfies a threshold; and cause output of a notification comprising an identity of the at least one of the plurality of different users.

(A2) An apparatus as described in paragraph (A1), wherein the instructions, when executed by the one or more processors, cause the computing device to generate the trust graph by processing a history of messages between the user and the plurality of different users.

(A3) An apparatus as described in any one of paragraphs (A1)-(A2), wherein the instructions, when executed by the one or more processors, cause the computing device to process the text to determine the at least one topic using a topic model.

(A4) An apparatus as described in paragraph (A3), wherein the topic model is a Latent Dirichlet allocation generative statistical model.

(A5) An apparatus as described in any one of paragraphs (A1)-(A4), wherein the notification is configured to prevent the user from adding the text to the messaging group until the user acknowledges the notification.

(A6) An apparatus as described in any one of paragraphs (A1)-(A5), wherein the threshold is based on a security level of the at least one topic.

(A7) An apparatus as described in any one of paragraphs (A1)-(A6), wherein the instructions, when executed by the one or more processors, further cause the computing device to: detect that a new user has joined the messaging group; and generate an updated trust graph that comprises a second plurality of connections between the user, each of the plurality of different users, and the new user.

(A8) An apparatus as described in any one of paragraphs (A1)-(A7), wherein the instructions, when executed by the one or more processors, cause the computing device to process the text to determine the at least one topic by causing the computing device to: provide, to a trained machine learning model, the text, wherein the trained machine learning model has been trained, using training data, to determine one or more topics based on input data, and wherein the training data comprises messaging data tagged based on the one or more topics; and receive, as output from the trained machine learning model and based on the text, the at least one topic.

(A9) An apparatus as described in any one of paragraphs (A1)-(A8), wherein the instructions, when executed by the one or more processors, cause the computing device to process the text to determine the at least one topic by causing the computing device to: remove, from the text, one or more stop words.

The following paragraphs (CRM1) through (CRM9) describe examples of computer-readable media that may be implemented in accordance with the present disclosure.

(CRM1) One or more non-transitory computer-readable media storing instructions that, when executed by one or more processors of a computing device, cause the computing device to: detect text, input by a user of a messaging application, associated with a messaging group comprising a plurality of different users; process the text to determine at least one topic; generate a trust graph that comprises a plurality of connections between the user and each of the plurality of different users, where each of the plurality of connections indicates a degree of trust, corresponding to the at least one topic, between the user and each of the plurality of different users; determine, based on the trust graph, that a first degree of trust, associated with at least one of the plurality of different users, satisfies a threshold; and cause output of a notification comprising an identity of the at least one of the plurality of different users.

(CRM2) One or more non-transitory computer-readable media as described in paragraph (CRM1), wherein the instructions, when executed by the one or more processors, cause the computing device to generate the trust graph by processing a history of messages between the user and the plurality of different users.

(CRM3) One or more non-transitory computer-readable media as described in any one of paragraphs (CRM1)-(CRM2), wherein the instructions, when executed by the one or more processors, cause the computing device to process the text to determine the at least one topic using a topic model.

(CRM4) One or more non-transitory computer-readable media as described in paragraph (CRM3), wherein the topic model is a Latent Dirichlet allocation generative statistical model.

(CRM5) One or more non-transitory computer-readable media described in any one of paragraphs (CRM1)-(CRM4), wherein the notification is configured to prevent the user from adding the text to the messaging group until the user acknowledges the notification.

(CRM6) One or more non-transitory computer-readable media as described in any one of paragraphs (CRM1)-(CRM5), wherein the threshold is based on a security level of the at least one topic.

(CRM7) One or more non-transitory computer-readable media as described in any one of paragraphs (CRM1)-(CRM6), wherein the instructions, when executed by the one or more processors, further cause the computing device to: detect that a new user has joined the messaging group; and generate an updated trust graph that comprises a second plurality of connections between the user, each of the plurality of different users, and the new user.

(CRM8) One or more non-transitory computer-readable media as described in any one of paragraphs (CRM1)-(CRM7), wherein the instructions, when executed by the one or more processors, cause the computing device to process the text to determine the at least one topic by causing the computing device to: provide, to a trained machine learning model, the text, wherein the trained machine learning model has been trained, using training data, to determine one or more topics based on input data, and wherein the training data comprises messaging data tagged based on the one or more topics; and receive, as output from the trained machine learning model and based on the text, the at least one topic.

(CRM9) One or more non-transitory computer-readable media as described in any one of paragraphs (CRM1)-(CRM8), wherein the instructions, when executed by the one or more processors, cause the computing device to process the text to determine the at least one topic by causing the computing device to: remove, from the text, one or more stop words.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:

one or more processors; and memory storing instructions that, when executed by the one or more processors, cause the computing device to:

detect text, input by a user of a messaging application, associated with a messaging group comprising a plurality of different users;

process the text to determine at least one topic;

generate a trust graph that comprises a plurality of connections between the user and each of the plurality of different users by processing a history of messages between the user and the plurality of different users, where each of the plurality of connections indicates a degree of trust, corresponding to the at least one topic, between the user and each of the plurality of different users, the degree of trust being based on a number of times the at least one topic had been discussed between the user and a specific user of the plurality of different users, the number of times being higher indicating a higher degree of trust and the number of times being lower indicating a lower degree of trust;

detect that a new user has joined the messaging group:

generate an updated trust graph that comprises a second plurality of connections between the user, each of the plurality of different users, and the new user:

determine, based on the updated trust graph, that a first degree of trust, associated with the new user, falls below a threshold, wherein the threshold is based on a security level of the at least one topic; and cause output of a notification comprising an identity of the new user as untrustworthy; and prevent the user from adding the text to the messaging group until the user acknowledges the notification by pressing a button or closing the notification.

2. The computing device of claim 1, wherein the instructions, when executed by the one or more processors, cause the computing device to process the text to determine the at least one topic using a topic model.

3. The computing device of claim 2, wherein the topic model is a Latent Dirichlet allocation generative statistical model.

4. The computing device of claim 1, wherein the instructions, when executed by the one or more processors, cause the computing device to process the text to determine the at least one topic by causing the computing device to:

provide, to a trained machine learning model, the text, wherein the trained machine learning model has been trained, using training data, to determine one or more topics based on input data, and wherein the training data comprises messaging data tagged based on the one or more topics; and receive, as output from the trained machine learning model and based on the text, the at least one topic.

5. The computing device of claim 1, wherein the instructions, when executed by the one or more processors, cause the computing device to process the text to determine the at least one topic by causing the computing device to:

remove, from the text, one or more stop words.

6. The computing device of claim 1, wherein the security level comprises a sensitivity level, and wherein:

based on a determination that the at least one topic corresponds to a higher sensitivity level, a higher threshold is selected for the first degree of trust, and based on a determination that the at least one topic corresponds to a lower sensitivity level, a lower threshold is selected for the first degree of trust.

7. The computing device of claim 1, wherein the text comprises a first topic and a second topic, and wherein the first topic is associated with a first threshold, the second topic is associated with a second threshold, and wherein the first threshold is different from the second threshold.

8. A method comprising:

detecting, by a computing device, text, input by a user of a messaging application, associated with a messaging group comprising a plurality of different users;

processing, by the computing device, the text to determine at least one topic;

generating, by the computing device, a trust graph that comprises a plurality of connections between the user and each of the plurality of different users by processing a history of messages between the user and the plurality of different users, where each of the plurality of connections indicates a degree of trust, corresponding to the at least one topic, between the user and each of the plurality of different users, the degree of trust being based on a number of times the at least one topic had been discussed between the user and a specific user of the plurality of different users, the number of times being higher indicating a higher degree of trust and the number of times being lower indicating a lower degree of trust;

detecting that a new user has joined the messaging group;

generating an updated trust graph that comprises a second plurality of connections between the user, each of the plurality of different users, and the new user;

determining, by the computing device and based on the updated trust graph, that a first degree of trust, associated with the new user, falls below a threshold, wherein the threshold is based on a security level of the at least one topic;

causing, by the computing device, output of a notification comprising an identity of the new user as untrustworthy; and preventing the user from adding the text to the messaging group until the user acknowledges the notification by pressing a button or closing the notification.

9. The method of claim 8, wherein processing the text to determine the at least one topic comprises use of a topic model.

10. The method of claim 9, wherein the topic model is a Latent Dirichlet allocation generative statistical model.

11. The method of claim 8, wherein the security level comprises a sensitivity level, and wherein:

based on a determination that the at least one topic corresponds to a higher sensitivity level, a higher threshold is selected for the first degree of trust, and based on a determination that the at least one topic corresponds to a lower sensitivity level, a lower threshold is selected for the first degree of trust.

12. The method of claim 8, wherein the text comprises a first topic and a second topic, and wherein the first topic is associated with a first threshold, the second topic is associated with a second threshold, and wherein the first threshold is different from the second threshold.

13. The method of claim 8, wherein processing the text to determine the at least one topic comprises:

providing, to a trained machine learning model, the text, wherein the trained machine learning model has been trained, using training data, to determine one or more topics based on input data, and wherein the training data comprises messaging data tagged based on the one or more topics; and receiving, as output from the trained machine learning model and based on the text, the at least one topic.

14. The method of claim 8, wherein processing the text to determine the at least one topic comprises:

remove, from the text, one or more stop words.

15. One or more non-transitory computer-readable media storing instructions that, when executed by one or more processors of a computing device, cause the computing device to:

detect text, input by a user of a messaging application, associated with a messaging group comprising a plurality of different users;

process the text to determine at least one topic;

generate a trust graph that comprises a plurality of connections between the user and each of the plurality of different users by processing a history of messages between the user and the plurality of different users, where each of the plurality of connections indicates a degree of trust, corresponding to the at least one topic, between the user and each of the plurality of different users, the degree of trust being based on a number of times the at least one topic had been discussed between the user and a specific user of the plurality of different users, the number of times being higher indicating a higher degree of trust and the number of times being lower indicating a lower degree of trust;

detect that a new user has joined the messaging group:

generate an updated trust graph that comprises a second plurality of connections between the user, each of the plurality of different users, and the new user:

determine, based on the updated trust graph, that a first degree of trust, associated with the new user, falls below a threshold, wherein the threshold is based on a security level of the at least one topic; and cause output of a notification comprising an identity of the new user as untrustworthy and prevent the user from adding the text to the messaging group until the user acknowledges the notification by pressing a button or closing the notification.

16. The computer-readable media of claim 15, wherein the instructions, when executed by the one or more processors, cause the computing device to process the text to determine the at least one topic using a topic model.

17. The computer-readable media of claim 16, wherein the topic model is a Latent Dirichlet allocation generative statistical model.

18. The computer-readable media of claim 15, wherein the security level comprises a sensitivity level, and wherein:

based on a determination that the at least one topic corresponds to a higher sensitivity level, a higher threshold is selected for the first degree of trust, and based on a determination that the at least one topic corresponds to a lower sensitivity level, a lower threshold is selected for the first degree of trust.

19. The computer-readable media of claim 15, wherein the instructions, when executed by the one or more processors, cause the computing device to process the text to determine the at least one topic by causing the computing device to:

provide, to a trained machine learning model, the text, wherein the trained machine learning model has been trained, using training data, to determine one or more topics based on input data, and wherein the training data comprises messaging data tagged based on the one or more topics; and receive, as output from the trained machine learning model and based on the text, the at least one topic.

20. The computer-readable media of claim 15, wherein the instructions, when executed by the one or more processors, cause the computing device to process the text to determine the at least one topic by causing the computing device to:

remove, from the text, one or more stop words.

* * * * *